(12) United States Patent
Bunda et al.

(10) Patent No.: US 11,156,300 B2
(45) Date of Patent: Oct. 26, 2021

(54) MULTI-PORT VALVE WITH PARTIAL CIRCUMFERENTIAL SEAL ARRANGEMENT

(71) Applicant: Robertshaw Controls Company, Itasca, IL (US)

(72) Inventors: Andrzej Bunda, Burbank, IL (US); Thomas J. Davern, St. Charles, IL (US)

(73) Assignee: Robertshaw Controls Company, Itasca, IL (US)

( * ) Notice: Subject to any disclaimer, the term of this patent is extended or adjusted under 35 U.S.C. 154(b) by 37 days.

(21) Appl. No.: 16/668,831

(22) Filed: Oct. 30, 2019

(65) Prior Publication Data

US 2021/0131575 A1     May 6, 2021

(51) Int. Cl.
*F16K 11/085* (2006.01)
*F16K 5/04* (2006.01)

(52) U.S. Cl.
CPC ........ *F16K 11/0856* (2013.01); *F16K 5/0471* (2013.01)

(58) Field of Classification Search
CPC .............. F16K 11/0856; F16K 5/0471; F16K 11/0853; Y10T 137/86871
See application file for complete search history.

(56) References Cited

U.S. PATENT DOCUMENTS

| | | | |
|---|---|---|---|
| 1,422,178 A | 7/1922 | Cooley | |
| 3,251,408 A | 5/1966 | Watson et al. | |
| 3,692,041 A * | 9/1972 | Bondi | F02C 7/22 137/238 |
| 3,927,693 A | 12/1975 | Johnston | |
| 4,021,190 A * | 5/1977 | Dickson | F23K 5/147 431/280 |
| 4,429,717 A | 2/1984 | Montgomery | |
| 4,655,252 A * | 4/1987 | Krumhansl | F16K 11/0853 137/269 |
| 4,909,933 A * | 3/1990 | Carter | B01D 61/243 137/625.19 |
| 4,968,334 A | 11/1990 | Hilton | |
| 5,084,031 A * | 1/1992 | Todd | A61B 5/02158 137/595 |
| 5,431,189 A | 7/1995 | Jones | |
| 5,529,758 A | 6/1996 | Houston | |

(Continued)

FOREIGN PATENT DOCUMENTS

CN    103857436 A    6/2014
EP    2713083 A1     4/2014

(Continued)

OTHER PUBLICATIONS

Forbes, Tesla Goes Open Source: Elon Musk Releases Patents to "Good Faith" Use, Jun. 12, 2014, 3 pages; https://www.forbes.com/sites/briansolomon/2014/06/12/tesla-goes-open-source-elon-musk-releases-patents-to-good-faith-use/#113922913c63.

(Continued)

*Primary Examiner* — Kevin R Barss
(74) *Attorney, Agent, or Firm* — Reinhart Boerner Van Deuren P.C.

(57) ABSTRACT

A multi-port valve having a partial circumferential seal is provided. The valve includes a shell body and a seal member contained within a housing. The seal member is constructed such that it does not completely circumscribe the shell body.

20 Claims, 6 Drawing Sheets

(56) References Cited

U.S. PATENT DOCUMENTS

| | | |
|---|---|---|
| 5,871,032 A | 2/1999 | Ko |
| 5,931,196 A * | 8/1999 | Bernardi ............. F16K 11/0856 |
| | | 137/625.46 |
| 6,245,233 B1 | 6/2001 | Lu |
| 6,308,739 B1 * | 10/2001 | Barbuto ................ F16K 5/0478 |
| | | 137/625.11 |
| 7,506,664 B2 | 3/2009 | Norris et al. |
| 7,837,771 B2 | 11/2010 | Barone |
| 8,336,319 B2 | 12/2012 | Johnston et al. |
| 8,402,776 B2 | 3/2013 | Johnston et al. |
| 8,557,415 B2 | 10/2013 | Herron et al. |
| 8,557,416 B2 | 10/2013 | Mardall et al. |
| 9,212,751 B2 | 12/2015 | McLane et al. |
| 9,527,403 B2 | 12/2016 | Mardall et al. |
| 9,618,128 B2 | 4/2017 | Dourdeville et al. |
| 9,687,769 B2 | 6/2017 | Mardall et al. |
| 9,701,210 B2 | 7/2017 | Woo et al. |
| 9,865,852 B2 | 1/2018 | Haer et al. |
| 2003/0125673 A1 | 7/2003 | Houde et al. |
| 2004/0221901 A1 | 11/2004 | Chen |
| 2005/0006150 A1 * | 1/2005 | Sims ....................... E21B 34/02 |
| | | 175/209 |
| 2006/0118066 A1 | 6/2006 | Martins |
| 2006/0237359 A1 | 10/2006 | Lin et al. |
| 2008/0223464 A1 | 9/2008 | Merrell |
| 2010/0319796 A1 | 12/2010 | Whitaker |
| 2011/0296855 A1 | 12/2011 | Johnston et al. |
| 2012/0183815 A1 | 7/2012 | Johnston et al. |
| 2012/0231306 A1 | 9/2012 | Herron et al. |
| 2012/0237803 A1 | 9/2012 | Mardall et al. |
| 2013/0263949 A1 * | 10/2013 | Bartnick ............. F16K 11/0856 |
| | | 137/625 |
| 2014/0053931 A1 | 2/2014 | Whitaker |
| 2014/0090414 A1 | 4/2014 | McLane et al. |
| 2014/0193683 A1 | 7/2014 | Mardall et al. |
| 2015/0217654 A1 | 8/2015 | Woo et al. |
| 2015/0306974 A1 | 10/2015 | Mardall et al. |
| 2015/0354716 A1 | 12/2015 | Morein |
| 2016/0200206 A1 | 7/2016 | Woo et al. |
| 2016/0380248 A1 | 12/2016 | Haer et al. |
| 2017/0056806 A1 | 3/2017 | Mardall et al. |
| 2017/0096073 A1 | 4/2017 | Mardall et al. |
| 2017/0152957 A1 | 6/2017 | Roche et al. |
| 2017/0214008 A9 | 7/2017 | Mardall et al. |
| 2017/0253107 A1 | 9/2017 | Castiglioni et al. |
| 2017/0259200 A1 | 9/2017 | Mardall et al. |
| 2018/0292016 A1 | 10/2018 | Ledvora et al. |

FOREIGN PATENT DOCUMENTS

| | | |
|---|---|---|
| EP | 2921750 A1 | 9/2015 |
| FR | 2940396 A1 | 6/2010 |
| GB | 270997 | 5/1927 |
| JP | 2015034560 A | 2/2015 |
| KR | 10-0412805 B1 | 12/2003 |

OTHER PUBLICATIONS

Randall et al., Bloomberg Businessweek, Hell for Elon Musk is a Midsize Sedan, Jul. 12, 2018, 15 pages, https://www.bloomberg.com/news/features/2018-07-12/how-tesla-s-model-3-became-elon-musk-s-version-of-hell.

Tesla Motors Club, Tesla Thermal Management System—explanation, Mar. 25, 2017, 11 pages, https://teslamotorsclub.com/tmc/threads/tesla-thermal-management-system-explanation.88055/.

U.S. Appl. No. 16/719,629, filed Dec. 18, 2019, Ledvora et al.

* cited by examiner

MULTI-PORT VALVE WITH PARTIAL CIRCUMFERENTIAL SEAL ARRANGEMENT

FIELD OF THE INVENTION

This invention generally relates to valves and more particularly to multi-port valves having multiple inlet and multiple outlet ports.

BACKGROUND OF THE INVENTION

Multi-port valve are used in a variety of industries and applications. Such valves include one or more inlet ports and on or more outlet ports. A valve member disposed within a housing of the valve is responsible for governing the flow between the various ports. A portion of the valve member, e.g. a valve stem, protrudes from the housing and is acted upon by an actuator attached to the multi-port valve. As result, the actuator governs the position of the valve member within the housing, which in turn governs the flow between the various ports.

Such multi-port valves advantageously provide a single flow device which can effectively replace multiple flow devices which only employ a single inlet and a single outlet. However, such multi-port valves are not without their own drawbacks. For example, the overall complexity of the valve increases as the number of ports increases. This can lead to relatively high part count assemblies. Furthermore, in many cases a number of individual seals are required to effectively seal the various ports of the multi-port valve off from one another. These multiple seals also lead to an increase in overall cost and complexity of the multi-port valve.

Yet further, many multi-port valve configurations typically require a relatively high actuation force to actuate the same. This is due in part to the relatively large seal configurations that typically contact the entire outer periphery of the valve member, and due in part to the relatively heavy and high inertia construction of the valve member itself. Indeed, the valve member is typically a solid piece of material with one or more pathways through the same.

Accordingly, there is a need in the art for a multi-port valve with a reduced overall complexity and lower actuation force requirement. The invention provides such a multi-port valve. These and other advantages of the invention, as well as additional inventive features, will be apparent from the description of the invention provided herein.

BRIEF SUMMARY OF THE INVENTION

In one aspect, the invention provides multi-port valve which allows for flow paths through a shell body of the valve in perpendicular planes. An embodiment according to this aspect includes a housing having a plurality of ports, a shell body situated within the housing and movable relative to the housing, and a seal member including a plurality of openings. Each one of the plurality of openings defines an opening axis passing through a center of the opening. A first plurality of the opening axes are arranged in a first plane, and wherein a second plurality of the opening axes are arranged in a second plane different from the first plane.

In certain embodiments according to this aspect, the shell body has a generally cylindrical outer periphery and the seal member partially contacts the generally cylindrical outer periphery such that the seal member does not circumscribe the generally cylindrical outer periphery.

In certain embodiments according to this aspect, the shell body includes a plurality of pockets formed in an exterior surface of the shell body, and a plurality of passageways extending through the shell body.

In certain embodiments according to this aspect, each one of the plurality of ports defines a port axis, wherein the port axes are non-radially extending. The port axes of the plurality of ports may be parallel. The plurality of ports may be arranged in rows and columns, and the first plane may be perpendicular to the second plane.

In another aspect, the invention provides a multi-port valve that presents a reduced actuation force due in part to the inclusion of a seal member that only partially circumscribes a shell body of the multi-port valve, thereby reducing contact between these components. An embodiment according to this aspect includes a housing having a plurality of ports. Each one of the plurality of ports defines a port axis, and the port axes are non-radially extending. This embodiment also includes a shell body situated within the housing and movable relative to the housing. The shell body includes a generally cylindrical outer periphery. The embodiment also includes a seal member that partially contacts the cylindrical outer periphery such that the seal member does not circumscribe the cylindrical outer periphery.

In certain embodiments according to this aspect, the seal member includes a plurality of openings, wherein each one of the plurality of openings defines an opening axis passing through a center of the opening. A first plurality of the opening axes may be arranged in a first plane, and a second plurality of the opening axes may be arranged in a second plane perpendicular to the first plane. The port axes of the plurality of ports may parallel. The plurality of ports may be arranged in rows and columns.

In certain embodiments according to this aspect, the shell body includes a plurality of pockets formed in an exterior surface of the shell body, and a plurality of passageways extending through the shell body. A cross section of each one of the plurality of pockets may be partially elliptical in shape. A cross section of each one of the plurality of passageways may be arcuate in shape.

In certain embodiments, the housing includes a removable cover and a seal interposed between the cover and the housing.

In yet another aspect, the invention provides a multi-port valve that includes a relatively lightweight and low inertia shell body that allows for multi-plane flow through the shell body. An embodiment according to this aspect includes a housing having a plurality of ports, and a shell body situated within the housing and movable relative to the housing. The shell body has a generally cylindrical outer periphery. The shell body includes a plurality of pockets formed in an exterior surface of the shell body, and a plurality of passageways extending through the shell body. This embodiment also includes a seal member having a plurality of openings interposed between an interior side of the housing and an exterior of the shell body.

In embodiments according to this aspect, each one of the plurality of ports defines a port axis and the plurality of port axes may be non-radially extending. The seal member partially contacts the generally cylindrical outer periphery such that the seal member does not circumscribe the generally cylindrical outer periphery.

In embodiments according to this aspect, each one of the plurality of openings of the seal member is bounded by a radially facing seal surface. The radially facing seal surfaces seal against an interior side of the valve housing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, an embodiment of a multi-port valve 20 (hereinafter referred to as valve 20) is illustrated. As elaborated upon in the following, valve 20 includes a seal member 32 (FIG. 2) that only partially surrounds a shell body 34 (FIG. 2) of valve 20. Such a configuration advantageously reduces the overall actuation force required to rotate shell body 34 within an interior space 38 (FIG. 2) of a housing 22 (FIG. 1) of valve 20. Further, housing 22 includes a plurality of ports 24a, 24b, 24c, 24d, 24e, 24f, 24g, 24h (FIG. 1) and seal member 32 includes a plurality of corresponding openings 54a, 54b, 54c, 54d, 54e, 54f, 54g, 54h arranged relative to ports 24a-h to allow for mutli-plane simultaneous flow.

Figure 1:
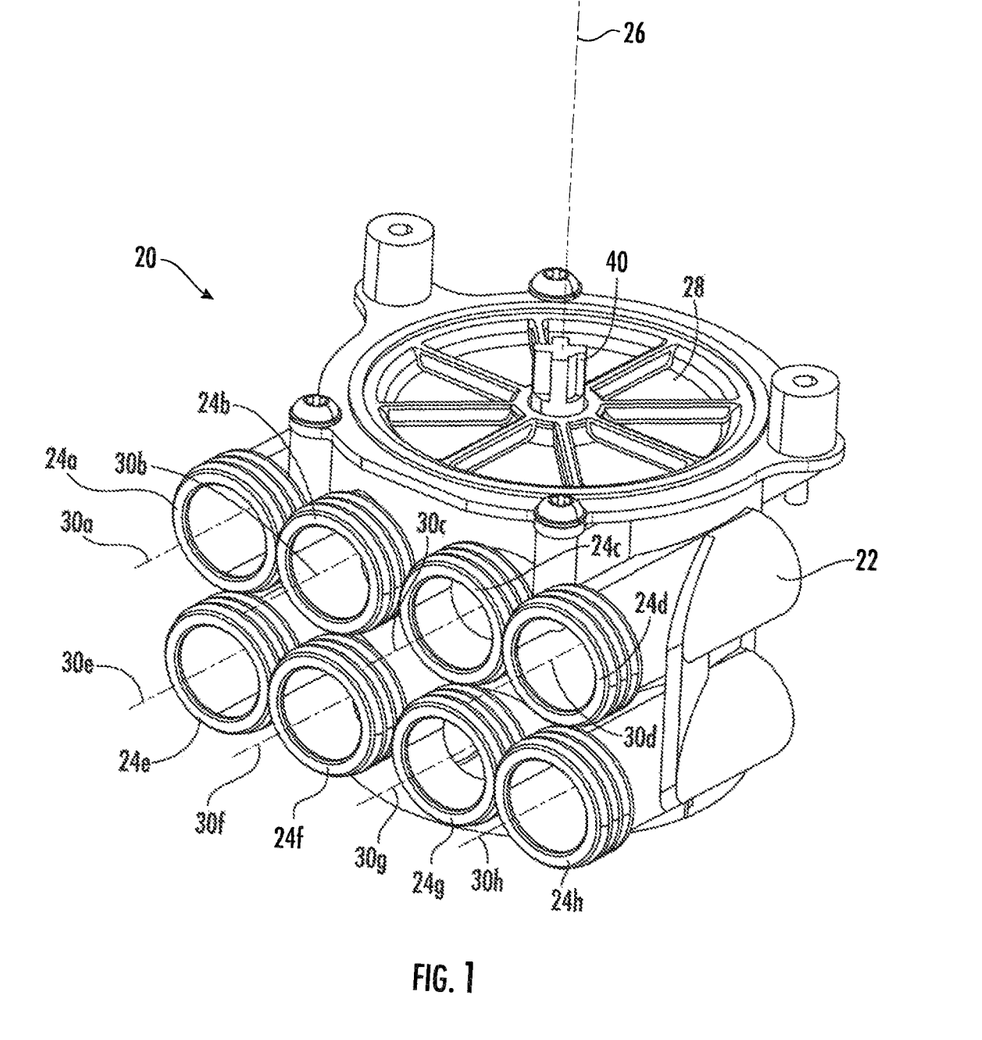
FIG. 1 is a perspective view of an exemplary embodiment of a valve with a partial circumferential seal arrangement constructed in accordance with the teachings herein.

With particular reference to FIG. 1, valve 20 includes the aforementioned housing 22, which defines the aforementioned ports 24a-h. Each port 24a-24h is in fluid communication with interior space 38 (FIG. 2) by way of an associated passageway shown through the drawings. Each port 24a-h defines its own port axis 30a-h, respectively, as shown. Axes 30a-h are arranged such that they are parallel to one another. Further, axes 30a-h are non-radially extending in that they do not pass through a center point of valve 20 defined along axis 26. As may also be surmised from FIG. 1, ports 24a-h are arranged in rows and columns. In other embodiments, however, it is contemplated that port axes 30a-h may be radially extending. It is also contemplated that in other embodiments port axes 30a-h may not all be parallel to one another, irrespective of whether they are radially or non-radially extending, e.g. certain axes could be at a right angle.

Housing 22 also includes a removable cover 28 which may be fastened to the remainder of housing 22 via any mechanical expedient. A seal 36 (FIG. 2) may be situated between cover 28 and housing 22. A valve stem 40 of shell body 34 (FIG. 2) is accessible through cover 28 and is configured for connection to an actuator (not shown), which may be any known actuator useful for actuating a valve.

Figure 2:
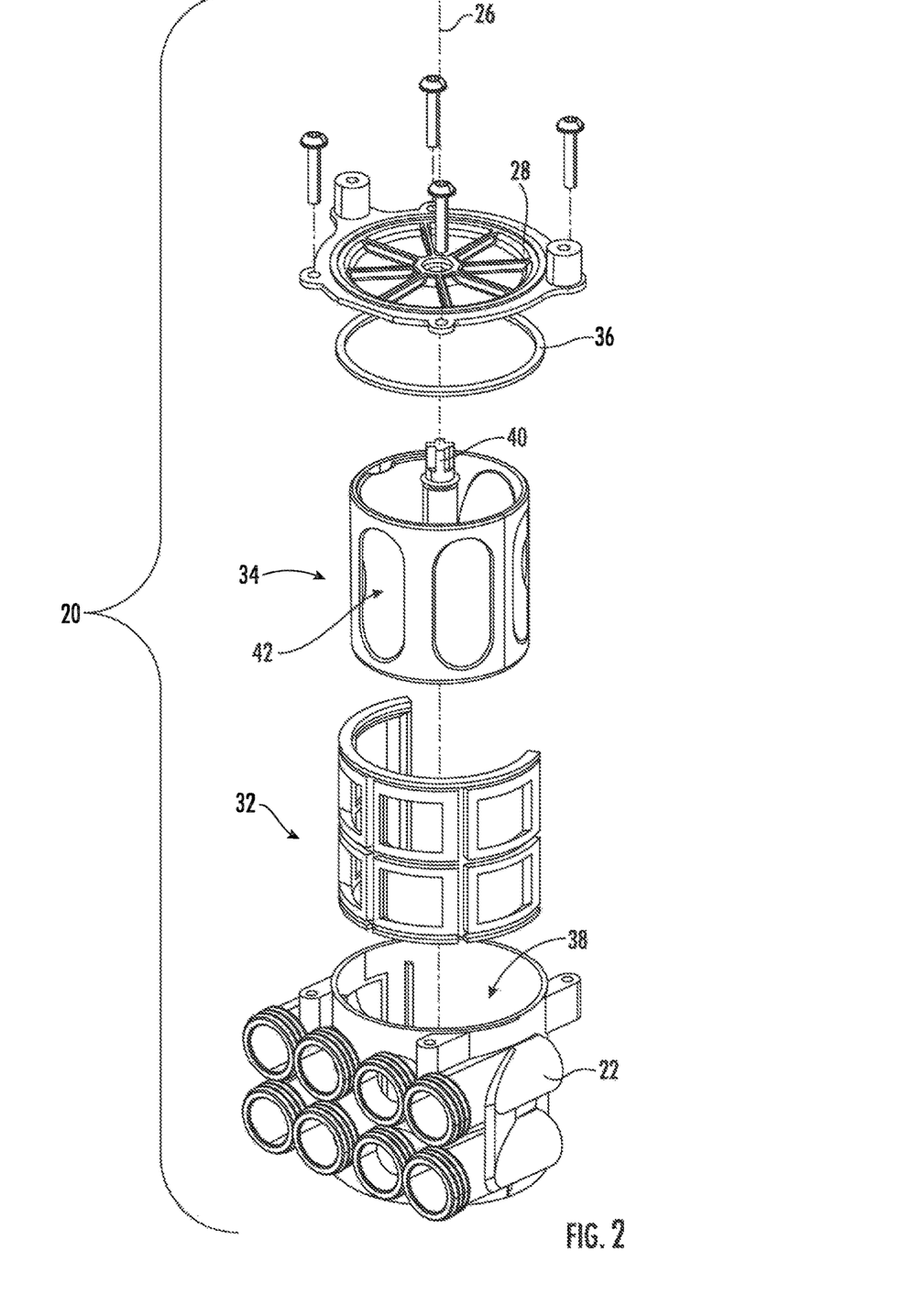
FIG. 2 is a perspective exploded view of the valve of FIG. 1.

Turning now to FIG. 2, seal member 32 is a partial circumferential seal member in that is only partially surrounds shell body 34 and thus does not circumscribe the entirety of the generally cylindrical outer periphery of shell body 34. By "generally cylindrical" it is meant that shell body 34 has a cylindrical shape not taking into account the pockets 42 or passageways 62 (FIG. 4) formed into shell body 34 described below. Shell body 34 is rotatable about axis 26 to govern flow between ports 24a-h (FIG. 1).

Figure 3:
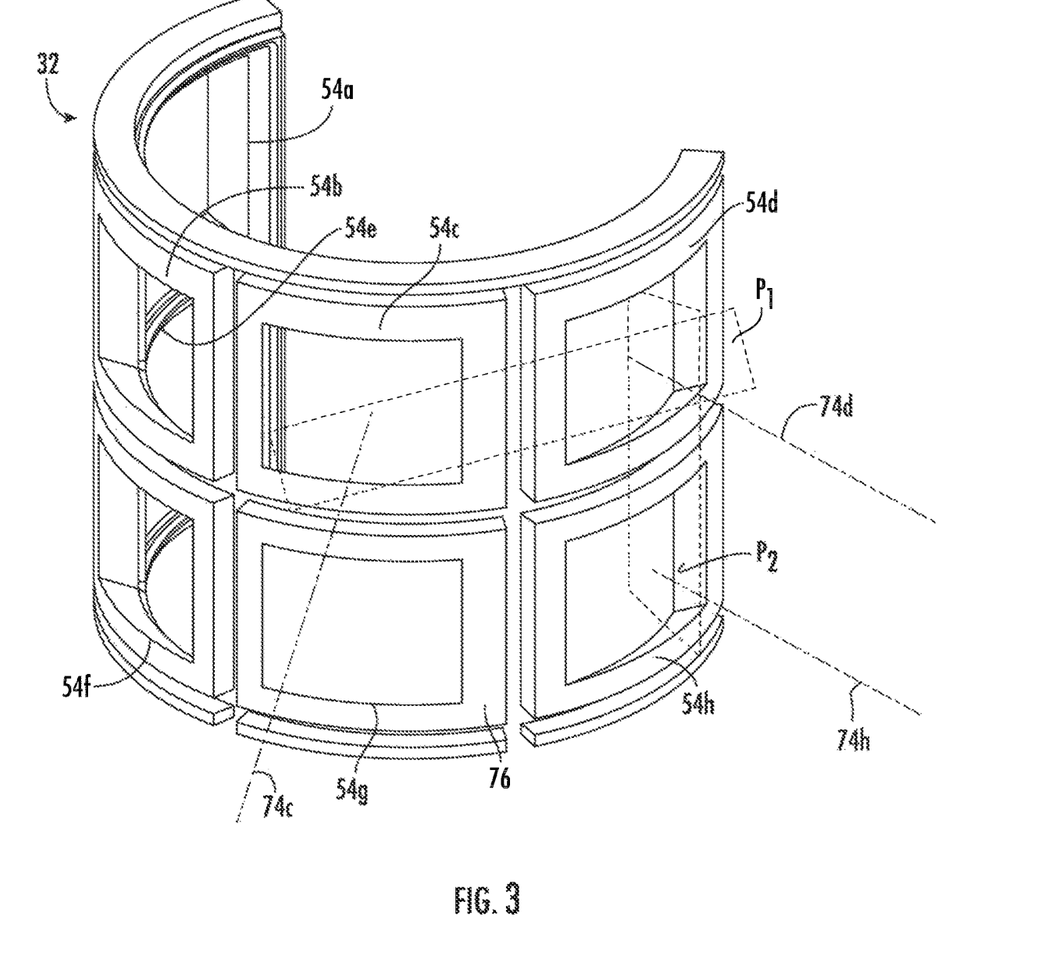
FIG. 3 is a perspective view of a seal member of the valve of FIG. 1.

Turning now to FIG. 3, the same illustrates seal member 32 in greater detail. Seal member 32 includes the aforementioned openings 54a-h. Each opening defines an axis extending normal to the opening. In the illustrated embodiment, only axes 74c, 74d, 74h are shown for purposes of clarity in the drawings. As may be surmised from the illustration and the above, the top four openings 54a-d define axes which are coplanar within a first plane $P_1$. While illustrated as a single element, it also contemplated that seal member 32 could comprise multiple separate elements circumferentially spaced from one another. Such spacing may be maintained by fixing such multiple seals in place by any known mechanical expedient. As one non-limiting example, such spacing could be maintained using locating ribs on the interior surface of 22. As such, a partial circumferential seal can include a single monolithic seal that does not extend the full circumference of interior space 38, or multiple individual seals, each of which does not extend the full circumference of interior space 38.

Further, each opening 54e-h defines an axis that is coplanar, respectively, with the axis associated with the opening 54a-d directly above openings 54e-h. An example of the foregoing may be seen by way of axes 74d and 74h which are coplanar within a second plane $P_2$. As such, a first plurality of the axes associated with openings 54a-h are contained within a first plane $P_1$, while a second plurality of the axes associated with openings 54a-h are contained within a second plane $P_2$ perpendicular to the first plane. However, it is also contemplated that one or more of the axes of the second plurality may be in a plane that is not perpendicular to the first plane. Such a configuration could, for example, be presented to accommodate installation.

Still referring to FIG. 3, each opening is also bounded by a seal surface 76 configured to radially seal against an interior surface, i.e. side, of housing 22. This sealing configuration restricts unintended cross flow between ports 24a-h.

Figure 4:
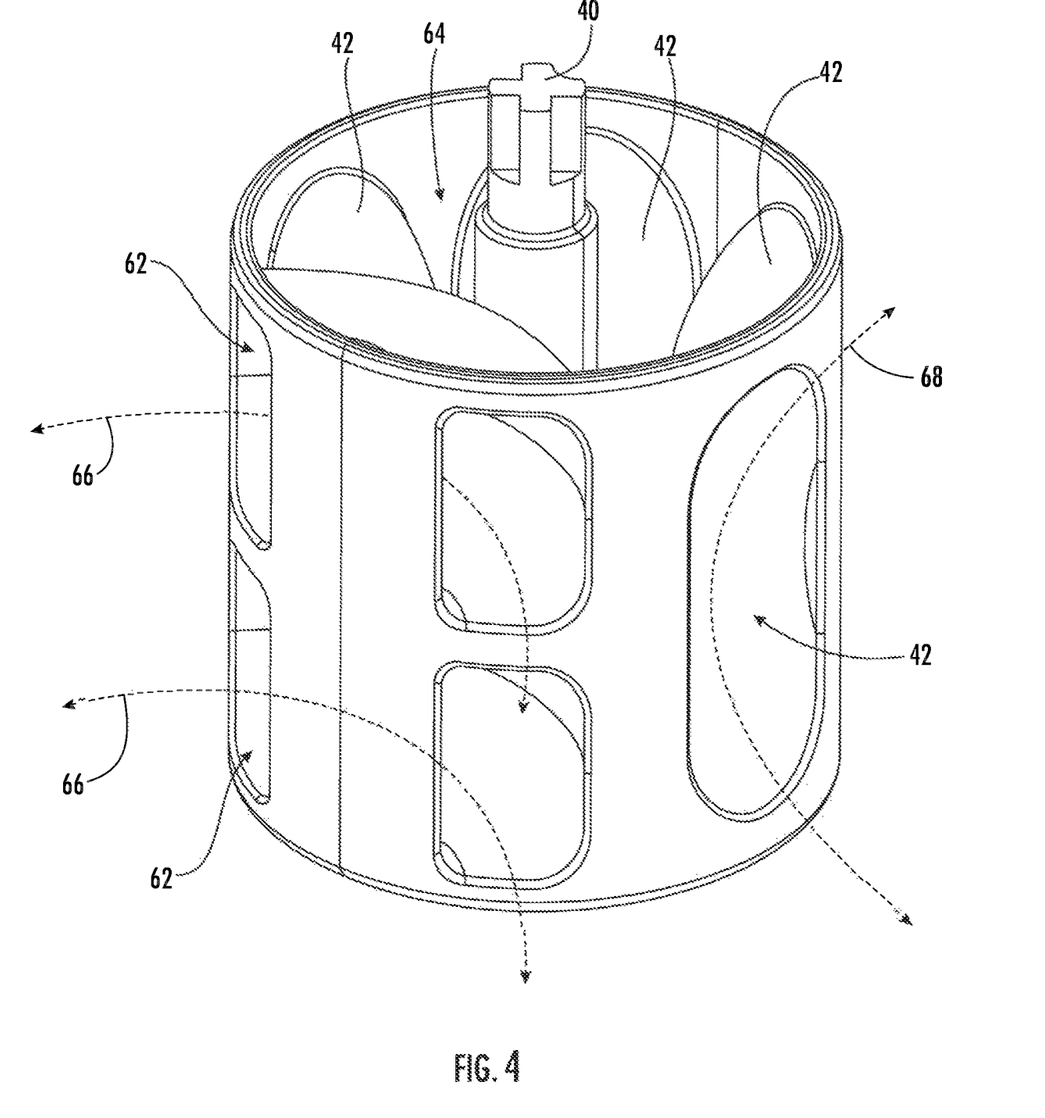
FIG. 4 is a perspective view of a shell body of the valve of FIG. 1.

Turning now to FIG. 4, the same illustrates shell body 34 in greater detail. As introduced above shell body 34 includes a plurality of identical pockets 42 and a plurality of identical passageways 62. Pockets are formed into the outer surface of shell body 34 as shown. Each pocket 42 is open in the radial direction of shell body 34 and faces radially outward. In contrast, passageways 62 are fully enclosed tunnel-like structures which extend through shell body 34. Fluid flow is generally directed along flow lines 66 through each passageway 62, while fluid flow is generally directed along flow line 68 through each pocket 42.

Taking into account ports 24a-h illustrated in FIG. 1, it may be seen from FIG. 4 that flow is possible between horizontally adjacent pairs of ports 24a and 24b, 24b and 24c, 24c and 24d, using the upper most passageway 62 in FIG. 4. The same holds true for horizontally adjacent pairs of ports 24e and 24f, 24f and 24g, 24g and 24h, using lower most passageway 62 in FIG. 4. Similarly, flow is also possible through vertically adjacent pairs of ports 24*a* and 24*e*, 24*b* and 24*f*, 24*c* and 24*g*, 24*d* and 24*h* using any one of pockets 42. Shell body 34 includes a generally hollow interior 64 to reduce its overall weight.

Figure 5:
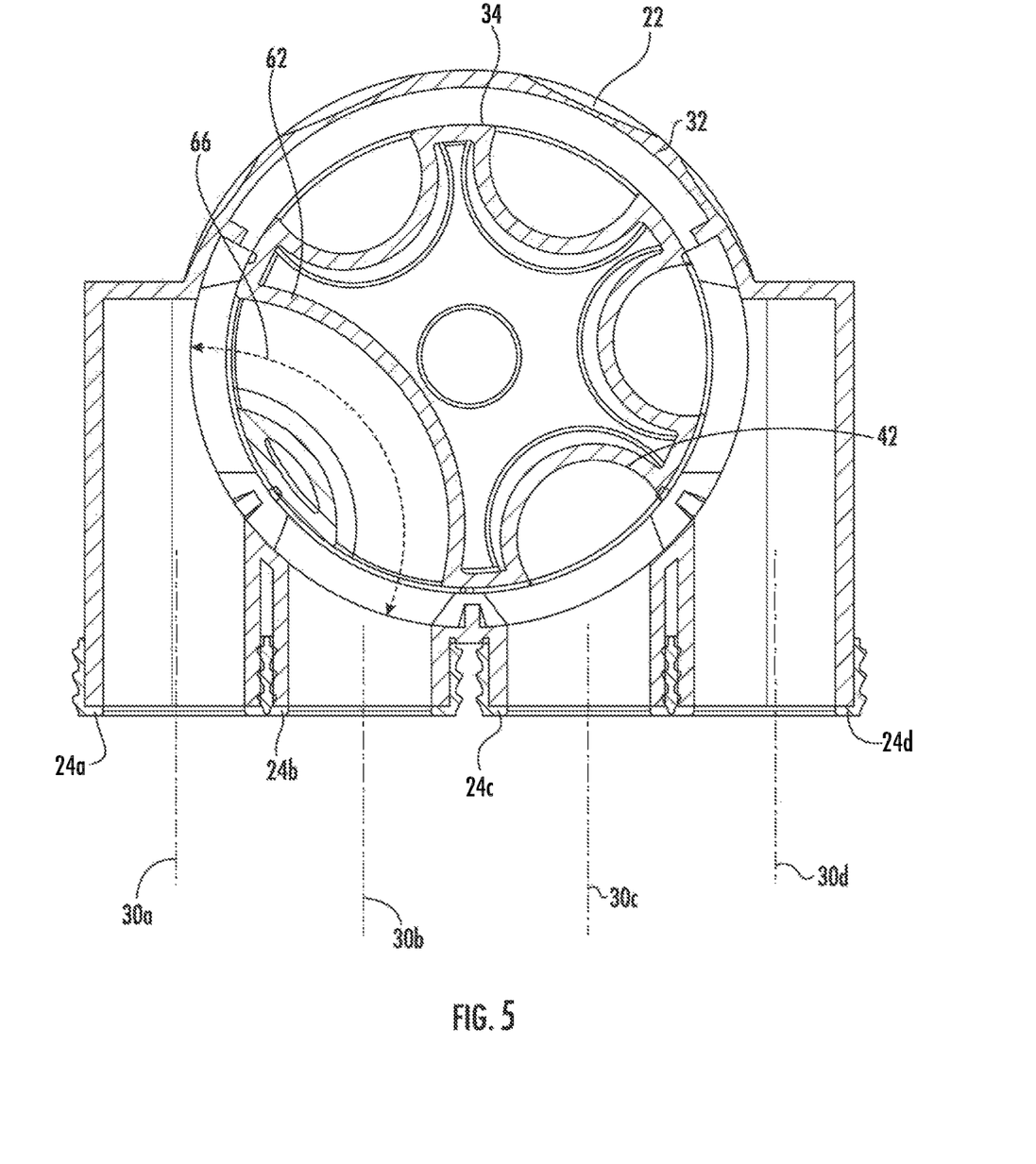
FIG. 5 is a cross section of the valve of FIG. 1.

Turning now to FIG. 5, the same illustrates a cross section of valve 20 taken through plane $P_1$ (FIG. 3). As may be seen in this view, with shell body 34 in the orientation shown, flow is permissible along flow path 62 between ports 24*a* and 24*b*, as well as along a flow path 42 (FIG. 4) between ports 24*c* and 24*g* and between ports 24*d* and 24*h*. In other words, pockets 42 and passageways 62 are arranged on shell body 34 such that it is possible to have multiple simultaneous flow paths through shell body 34, notably along flow paths 66, 68 which are in planes perpendicular to one another. Also visible in FIG. 5 is the arcuate shape of the cross section passageways 62. This curvature of this arcuate shape is configured to allow the horizontally adjacent port communication mentioned above.

Figure 6:
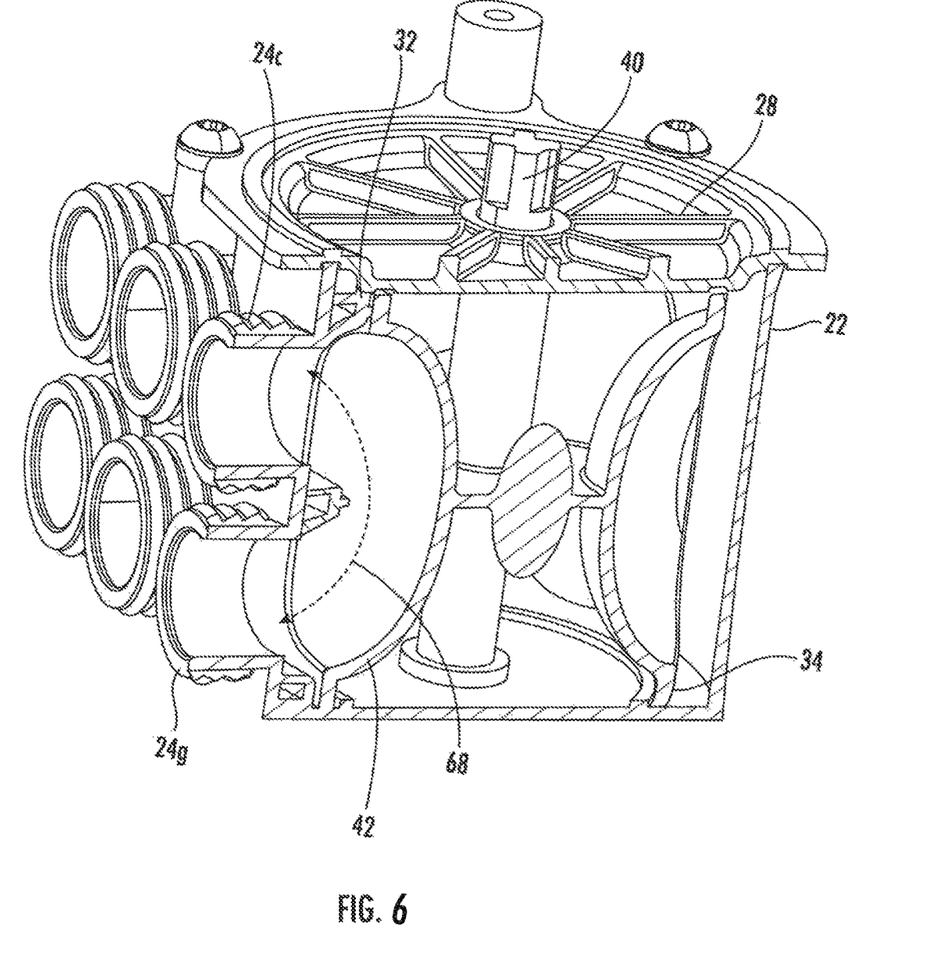
FIG. 6 is another cross section of the valve of FIG. 1, taken through a plane that is perpendicular to the cross sectional plane shown in FIG. 5.

With reference to FIG. 6, the same illustrates another cross section of valve 20, with shell body 34 in the same orientation as that shown in FIG. 5. As may be seen in this view, a pocket 42 is aligned with ports 24*c* and 24*g* to facilitate flow therebetween along flow path 68. As is also visible in this view, each pocket 42 has a partially elliptical cross section. While shown as a generally shell-like member with the pockets 42 and passageways 62 extending therethrough as shown, it is also contemplated that shell body 34 could be a solid member with the pockets and passageways formed into shell body 34, e.g. via molding or via additive manufacturing. Notwithstanding the foregoing described and illustrated arrangement of ports that face in the same direction, it is also contemplated that certain ones of the ports may be arranged such that their respective axes are spaced 180 degrees from one another, allowing straight through flow through the valve, or any other angle depending on application.

In alternative embodiments, it is envisioned that fewer or less ports than those could be utilized. Further it is also envisioned that pockets 42 or passageways 62 can be formed to communicate more than one port with one other port. For example, if one end of passageways 62 was large enough to communicate to vertically aligned ports, and the other remained the same size as that shown in the drawings, one could a flow path from one port to two ports and vice versa. The same holds true for pockets 42. For example, pockets 42 could have a general L-shape to allow two horizontally adjacent ports to communicate with port vertically aligned with one of the two horizontally adjacent ports.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-port valve, comprising:
   a housing having a plurality of ports;
   a shell body situated within the housing, the shell body movable relative to the housing;
   a seal member, the seal member including a plurality of openings, wherein each one of the plurality of openings defines an opening axis passing through a center of the opening; and
   wherein a first plurality of the opening axes are arranged in a first plane, and wherein a second plurality of the opening axes are arranged in a second plane different from the first plane.

2. A multi-port valve, comprising:
   a housing having a plurality of ports;
   a shell body situated within the housing, the shell body movable relative to the housing;
   a seal member, the seal member including a plurality of openings, wherein each one of the plurality of openings defines an opening axis passing through a center of the opening; and
   wherein a first plurality of the opening axes are arranged in a first plane, and wherein a second plurality of the opening axes are arranged in a second plane different from the first plane;
   wherein each one of the plurality of ports defines a port axis, wherein the port axes are non-radially extending.

3. The multi-port valve of claim 2, wherein the shell body has a generally cylindrical outer periphery, wherein the seal member partially contacts the generally cylindrical outer periphery such that the seal member does not circumscribe the generally cylindrical outer periphery.

4. The multi-port valve of claim 2, wherein the shell body includes a plurality of pockets formed in an exterior surface of the shell body, and a plurality of passageways extending through the shell body.

5. The multi-port valve of claim 2, wherein the port axes of the plurality of ports are parallel.

6. The multi-port valve of claim 2, wherein the plurality of ports are arranged in rows and columns such that first and second planes are perpendicular.

7. A multi-port valve, comprising:
a housing having a plurality of ports, wherein each one of the plurality of ports defines a port axis, wherein the port axes are non-radially extending;
a shell body situated within the housing, the shell body movable relative to the housing and having a generally cylindrical outer periphery; and
a seal member, the seal member partially contacting the generally cylindrical outer periphery such that the seal member does not circumscribe the generally cylindrical outer periphery.

8. The multi-port valve of claim 7, wherein the housing includes a removable cover and a seal interposed between the cover and the housing.

9. The multi-port valve of claim 7, wherein the seal member includes a plurality of openings, wherein each one of the plurality of openings defines an opening axis passing through a center of the opening.

10. The multi-port valve of claim 9, wherein a first plurality of the opening axes are arranged in a first plane, and wherein a second plurality of the opening axes are arranged in a second plane perpendicular to the first plane.

11. The multi-port valve of claim 10, wherein the shell body includes a plurality of pockets formed in an exterior surface of the shell body, and a plurality of passageways extending through the shell body.

12. The multi-port valve of claim 11, wherein a cross section of each one of the plurality of pockets is partially elliptical in shape.

13. The multi-port valve of claim 11, wherein a cross section of each one of the plurality of passageways is arcuate in shape.

14. The multi-port valve of claim 10, wherein the port axes of the plurality of ports are parallel.

15. The multi-port valve of claim 14, wherein the plurality of ports are arranged in rows and columns.

16. A multi-port valve, comprising:
a housing having a plurality of ports;
a shell body situated within the housing, the shell body movable relative to the housing the shell body having a generally cylindrical outer periphery, the shell body including a plurality of pockets formed in an exterior surface of the shell body, and a plurality of passageways extending through the shell body; and
a seal member, the seal member including a plurality of openings interposed between the an interior side of the housing and an exterior of the shell body.

17. A multi-port valve, comprising:
a housing having a plurality of ports;
a shell body situated within the housing, the shell body movable relative to the housing the shell body having a generally cylindrical outer periphery, the shell body including a plurality of pockets formed in an exterior surface of the shell body, and a plurality of passageways extending through the shell body; and
a seal member, the seal member including a plurality of openings interposed between the an interior side of the housing and an exterior of the shell body;
wherein each one of the plurality of ports defines a port axis, wherein the plurality of port axes are non-radially extending.

18. The multi-port valve of claim 17, wherein the seal member partially contacts the generally cylindrical outer periphery such that the seal member does not circumscribe the generally cylindrical outer periphery.

19. The multi-port valve of claim 18, wherein each one of the plurality of openings of the seal member is bounded by a radially facing seal surface.

20. The multi-port valve of claim 19, wherein the radially facing seal surfaces seal against an interior side of the valve housing.

* * * * *